United States Patent
Lundgren et al.

(10) Patent No.: US 9,653,938 B2
(45) Date of Patent: *May 16, 2017

(54) METHOD AND APPARATUS FOR IMPROVING ELECTRONICS DEVICES WIRELESS CHARGING USING INERTIAL SENSORS

(75) Inventors: Mika-Petteri Lundgren, Salo (FI); Mikko Vuori, Nakkila (FI)

(73) Assignee: Nokia Technologies Oy, Espoo (FI)

( * ) Notice: Subject to any disclaimer, the term of this patent is extended or adjusted under 35 U.S.C. 154(b) by 138 days.

This patent is subject to a terminal disclaimer.

(21) Appl. No.: 14/362,812

(22) PCT Filed: Dec. 14, 2011

(86) PCT No.: PCT/FI2011/051106
§ 371 (c)(1),
(2), (4) Date: Jun. 4, 2014

(87) PCT Pub. No.: WO2013/087970
PCT Pub. Date: Jun. 20, 2013

(65) Prior Publication Data
US 2014/0312836 A1    Oct. 23, 2014

(51) Int. Cl.
*H02J 7/00* (2006.01)
*H02J 7/02* (2016.01)
(52) U.S. Cl.
CPC .......... *H02J 7/025* (2013.01); *H02J 7/0047* (2013.01); *H02J 2007/0049* (2013.01)
(58) Field of Classification Search
CPC .............. B60L 11/182; B60L 11/1816; B60L 11/1829; H02J 7/025; H02J 7/045
(Continued)

(56) References Cited

U.S. PATENT DOCUMENTS

| 5,159,258 A | 10/1992 | Kolvites et al. |
| 2009/0096413 A1 | 4/2009 | Partovi et al. |

(Continued)

FOREIGN PATENT DOCUMENTS

| EP | 2086085 A1 | 8/2009 |
| JP | 2011062028 | 3/2011 |

OTHER PUBLICATIONS

International Search Report and Written Opinion received for corresponding Patent Cooperation Treaty Application No. PCT/FI2011/051106, dated Aug. 21, 2012, 12 pages.

(Continued)

*Primary Examiner* — Paul Dinh
(74) *Attorney, Agent, or Firm* — Ditthavong & Steiner, P.C.

(57) ABSTRACT

In accordance with an example embodiment of the present invention, a method comprises: monitoring a motion of a handset from a wireless charger to detect a presence of the handset on the wireless charger (312); initiating a wireless charging when the presence of the handset is detected on the wireless charger and transmitting a charging notification to an end user (318); sending a battery full message for notifying the end user when the wireless charging is complete and terminating the wireless charging (316); setting the handset to a standby mode and initializing inertial sensor(s) to provide an interrupt signal (330); entering a maintenance charging mode of a battery of the handset when it is below a recharging threshold without notifying the end user (336); and continuing the maintenance charging mode of the wireless charging device until the battery is full (342) or the wireless charging device is removed from the wireless charger transmitter (340).

12 Claims, 4 Drawing Sheets

(58) Field of Classification Search
USPC .................................. 320/108, 132, 137, 149
See application file for complete search history.

(56) References Cited

U.S. PATENT DOCUMENTS

| | | |
|---|---|---|
| 2009/0140690 A1 | 6/2009 | Jung |
| 2009/0174264 A1* | 7/2009 | Onishi .................... H02J 5/005 307/104 |
| 2010/0084918 A1 | 4/2010 | Fells et al. |
| 2011/0006611 A1 | 1/2011 | Baarman et al. |
| 2011/0018679 A1 | 1/2011 | Davis et al. |

OTHER PUBLICATIONS

"System Description Wireless Power Transfer", Wireless Power Consortium, vol. 1, Version 1.0.3-2, Sep. 2011, 90 pages.
International Search Report and Written Opinion received for corresponding Patent Cooperation Treaty Application No. PCT/FI2011/051111, dated Mar. 12, 2012, 14 pages.

* cited by examiner

METHOD AND APPARATUS FOR IMPROVING ELECTRONICS DEVICES WIRELESS CHARGING USING INERTIAL SENSORS

RELATED APPLICATION

This application was originally filed as PCT Application No. PCT/FI2011/051106 filed Dec. 14, 2011.

TECHNICAL FIELD

The present application relates generally to the charging of electronic devices and more particularly to methods and apparatuses for improving the wireless charging of portable electronic devices using inertial sensors and providing correct user interface notifications to end users.

BACKGROUND

Currently when handset is fully charged with wireless charger and end user removes the handset from the wireless charger and returns it back to the wireless charger before the battery voltage of the handset has dropped below a recharging threshold, the handset will not show battery full message to the end user. Hence, the end user might perceive or conclude that the handset is not operating properly or broken, since no notification is shown when the handset was returned back to the wireless charger.

The reason of this lack of user interface friendly environment is that inbuilt wireless charging in handsets is still at its early stage and these kinds of issues are still to be addressed.

SUMMARY

Various aspects of examples of the invention are set out in the claims.

According to a first aspect of the present invention, a method comprises: monitoring a motion of a handset from a wireless charger to detect a presence of the handset on the wireless charger; initiating a wireless charging when the presence of the handset is detected on the wireless charger and transmitting a charging notification to an end user; sending a battery full message for notifying the end user when the wireless charging is complete and terminating the wireless charging; setting the handset to a standby mode and initializing inertial sensor(s) to provide an interrupt signal; entering a maintenance charging mode of a battery of the handset when it is below a recharging threshold without notifying the end user; and continuing the maintenance charging mode of the wireless charging device until the battery is full or the wireless charging device is removed from the wireless charger transmitter According to a second aspect of the present invention, a wireless charging system comprises: a wireless charger transmitter; a wireless handset including: a battery; an inertial sensor configured to generate an interrupt signal in response to its motion; and a power management configured to detect the interrupt signal to initiate charging the battery when a battery voltage is below a recharging threshold.

According to a third aspect of the present invention, an apparatus comprises: means for monitoring a motion of a handset from a wireless charger to detect a presence of the handset on the wireless charger; means for initiating a wireless charging when the presence of the handset is detected on the wireless charger and transmitting a charging notification to an end user; means for sending a battery full message for notifying the end user when the wireless charging is complete and terminating the wireless charging; means for setting the handset to a standby mode and initializing inertial sensor(s) to provide an interrupt signal; means for entering a maintenance charging mode of a battery of the handset when it is below a recharging threshold without notifying the end user; and means for continuing the maintenance charging mode of the wireless charging device until the battery is full or the wireless charging device is removed from the wireless charger transmitter.

According to a fourth aspect of the present invention, an apparatus comprises: at least one processor; and at least one memory including computer program code; the at least one memory and the computer program code configured to, with the at least one processor, cause the apparatus to perform at least the following: monitoring a motion of a handset from a wireless charger to detect a presence of the handset on the wireless charger; initiating a wireless charging when the presence of the handset is detected on the wireless charger and transmitting a charging notification to an end user; sending a battery full message for notifying the end user when the wireless charging is complete and terminating the wireless charging; setting the handset to a standby mode and initializing inertial sensor(s) to provide an interrupt signal; entering a maintenance charging mode of a battery of the handset when it is below a recharging threshold without notifying the end user; and continuing the maintenance charging mode of the wireless charging device until the battery is full or the wireless charging device is removed from the wireless charger transmitter According to a fifth aspect of the present invention, a computer program, comprises: code for monitoring a motion of a handset from a wireless charger to detect a presence of the handset on the wireless charger; code for initiating a wireless charging when the presence of the handset is detected on the wireless charger and transmitting a charging notification to an end user; code for sending a battery full message for notifying the end user when the wireless charging is complete and terminating the wireless charging; code for setting the handset to a standby mode and initializing inertial sensor(s) to provide an interrupt signal; code for entering a maintenance charging mode of a battery of the handset when it is below a recharging threshold without notifying the end user; and code for continuing the maintenance charging mode of the wireless charging device until the battery is full or the wireless charging device is removed from the wireless charger transmitter.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION OF THE DRAWINGS

An example embodiment of the present invention and its potential advantages are understood by referring to FIGS. 1 through 4.

The present invention utilizes inertial sensor(s) to detect the presence of a handset on a wireless charger and more particularly to detect whether the handset is removed from the wireless charger once the battery is/was fully charged. In that way, the handset is able to notify the end user that the handset battery is full in case the handset is returned back on wireless charger before the battery voltage has dropped below a recharging threshold. If the handset is not removed from the wireless charger, no notifications during the maintenance charging is shown to the end user (for example no notifications during night time) because no interrupt is detected by the inertial sensor(s) of the handset.

In an exemplary implementation at least one inertial sensor, such as an accelerometer or a gyroscope is connected to a processor or a power management ASIC of the handset in order to generate interrupt signals in case the handset is removed from the wireless charger once the handset battery is fully charged or during the maintenance charging phase. The SoftWare implementation can be performed according to FIG. 3. An example of a simplified illustration of the HardWare connections is illustrated in FIG. 4.

Clear notifications of the handset along with clear implementation will prevent unnecessary notifications to the end user. For example, there are no frustrating notifications during night time because no notifications will be shown when the handset is entering the maintenance charging phase.

This present invention also ensures that the end user gets all basic or necessary information. For example, notifications that the battery is full once the handset is fully charged, and notifications that no charging is ongoing because the battery is full i.e. the battery voltage is above the recharging threshold. In the same way, the end user also gets all basic or necessary information on when the fully charged handset is removed from the wireless charger and returned back to the wireless charger before the handset battery voltage has dropped below a recharging threshold.

Figure 1:
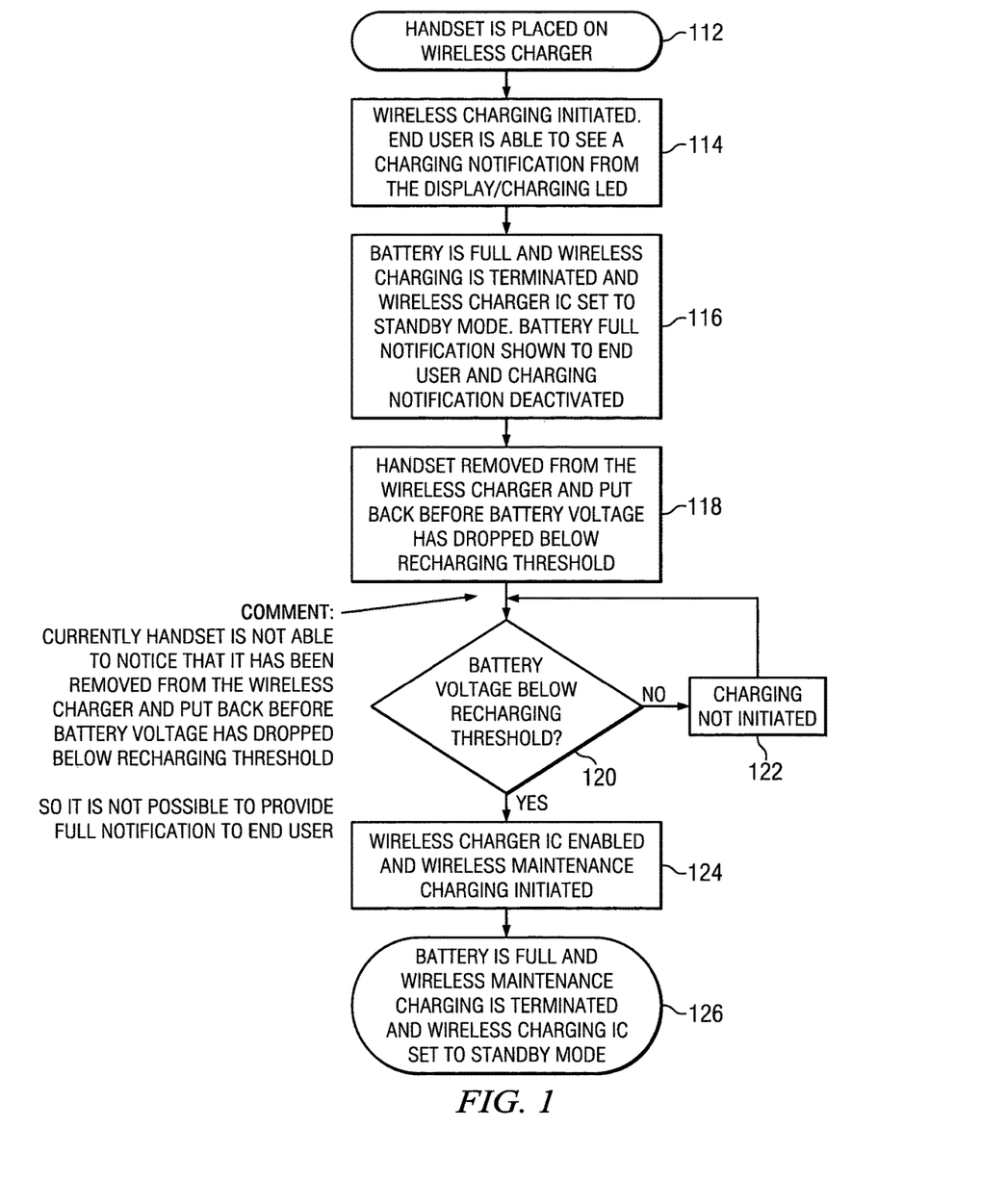
FIG. 1 shows an example of current handset behavior charged using wireless charger when a fully charged handset is removed from a wireless charger and returned back to the wireless charger before the handset battery voltage has dropped below a recharging threshold.

FIG. 1 shows an existing behavior of a wireless charging process when a fully charged electrical device or a handset is removed from the wireless charger and returned back before the handset battery voltage has dropped below the recharging threshold.

At step 112, the electrical device or handset is placed on a wireless charger.

At step 114, the wireless charging is initiated. The end user is able to see a charging notification from the display/charging screen which can be a LED or any other type of display notification of the wireless charger receiver or the handset itself.

At step 116, once the battery of the electrical device or handset is fully charged, the wireless charging initiated by the wireless charger is terminated. Hence, the wireless charging IC is set to a standby mode and the charging notification is deactivated.

At step 118, the wireless charger detects that the electrical device or handset is removed from the wireless charger and returned back to the wireless charger before the handset battery voltage has dropped below recharging threshold. Without the implementation of the present invention, the handset or the electrical device is not able to detect that it has been removed from the wireless charger and returned back to the wireless charger, which results in the end user not being informed by a battery full notification.

At step 120, it is tested whether the battery voltage is below recharging threshold. If it is not, the charging process is not initiated at step 122. And the battery voltage is periodically tested until it detected that the battery voltage is below the recharging threshold. In which case, at step 124, the wireless charger IC is enabled and the wireless charging process is initiated.

The electrical device or the handset is charged until the battery is full. At which step 126, the wireless charging process is terminated and the wireless charging IC is set to standby mode.

Figure 2:
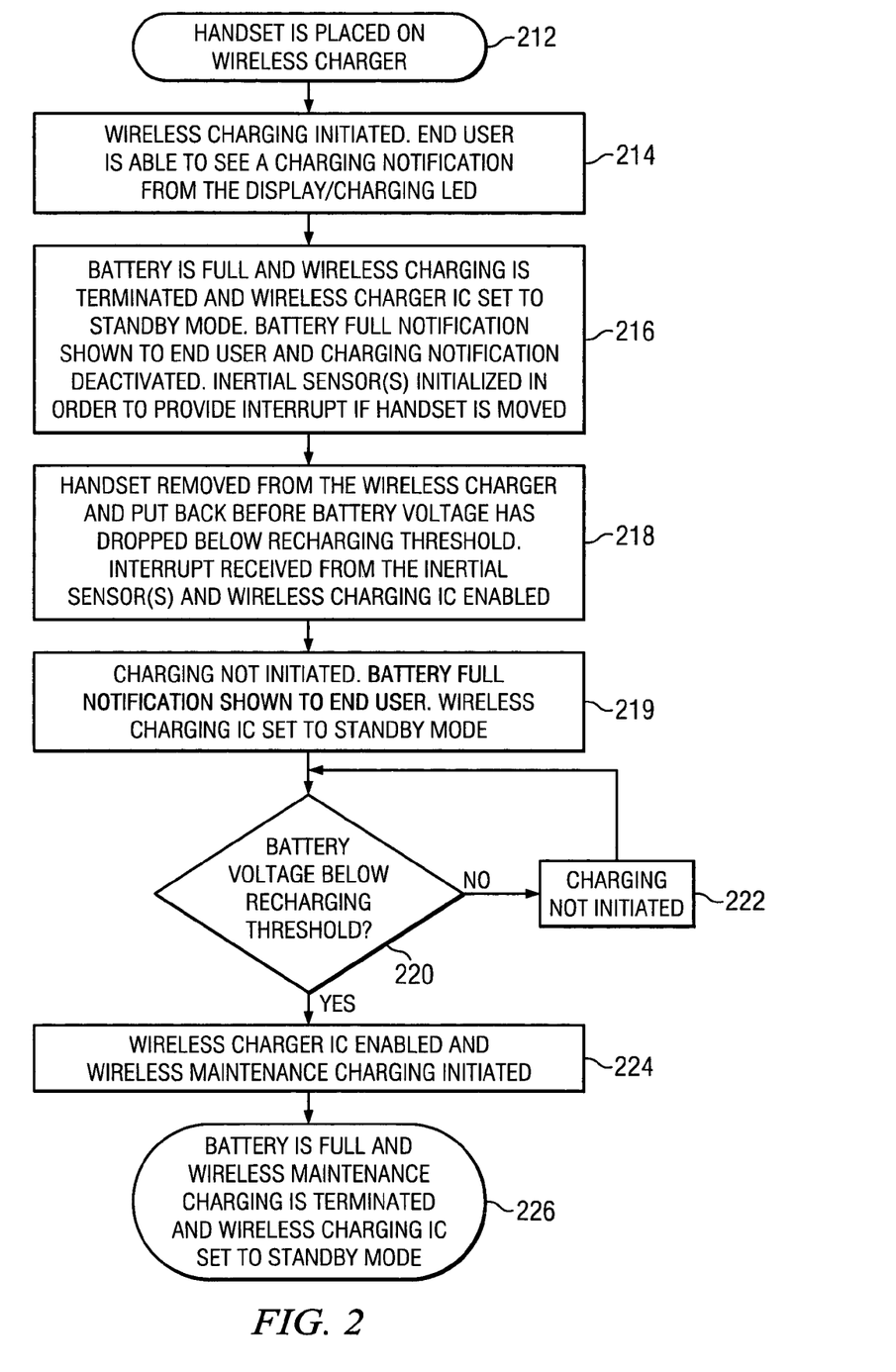
FIG. 2 shows an example of behavior of an inertial sensor assisted handset charged using wireless charger when a fully charged handset is removed from the wireless charger and returned back to the wireless charger before the handset battery voltage has dropped below a recharging threshold.

FIG. 2 shows a behavior of inertial sensor assisted wireless charging when a fully charged handset is removed from a wireless charger and put back before the handset battery voltage has dropped below recharging threshold.

At step 212, the handset is placed on the wireless charger which can be any type of connection-less charging system receiving power from a power source. The wireless charger or the connection-less charging system is able to convert the received power into a power signal that could be received by a transducer circuit of the handset. The transducer is able to convert the power signal into a form of energy that could be stored in the handset battery. Such power signal capable of transporting energy without requiring connection or physical structure is known in the art.

At step 214, the wireless charging procedure is initiated. The end user receives a charging notification on the display/charging LED or any other type of display notification of the wireless charger receiver or the handset itself.

At step 216, after a certain time of charging, the battery is full and the wireless charging process is terminated. At the same time, the wireless charging IC is set to a standby mode. The battery full notification is shown to the end user and the charging notification is then deactivated. The inertial sensor(s) is (are) then initialized to provide an interrupt signal if it is detected that the handset is moved.

The handset is then removed from the wireless charger or the connection-less charging system and returned back before the handset battery voltage has dropped below recharging threshold. At which step 218, an interrupt signal is received from the inertial sensor(s) and the wireless charging IC is then enabled.

Since the handset battery voltage has not dropped below recharging threshold, the charging process is not initiated and a battery full notification is shown to the end user. The wireless charging IC is set to the standby mode at step 219.

At step 220, it is determined if the battery voltage is below a charging threshold?

At step 222, if the battery voltage is above the charging threshold, the charging process is not initiated.

At step 224, if the battery voltage is below the charging threshold, the wireless charger IC is enabled and the wireless maintenance charging process is initiated.

At step 226, once the battery is full, the wireless maintenance charging process is terminated and the wireless charging IC is set to the standby mode.

When the handset is to be in the maintenance charging mode, no charging notifications are shown to the end user.

Therefore, no battery full notification is shown to the end user after the maintenance charging mode.

Figure 3:
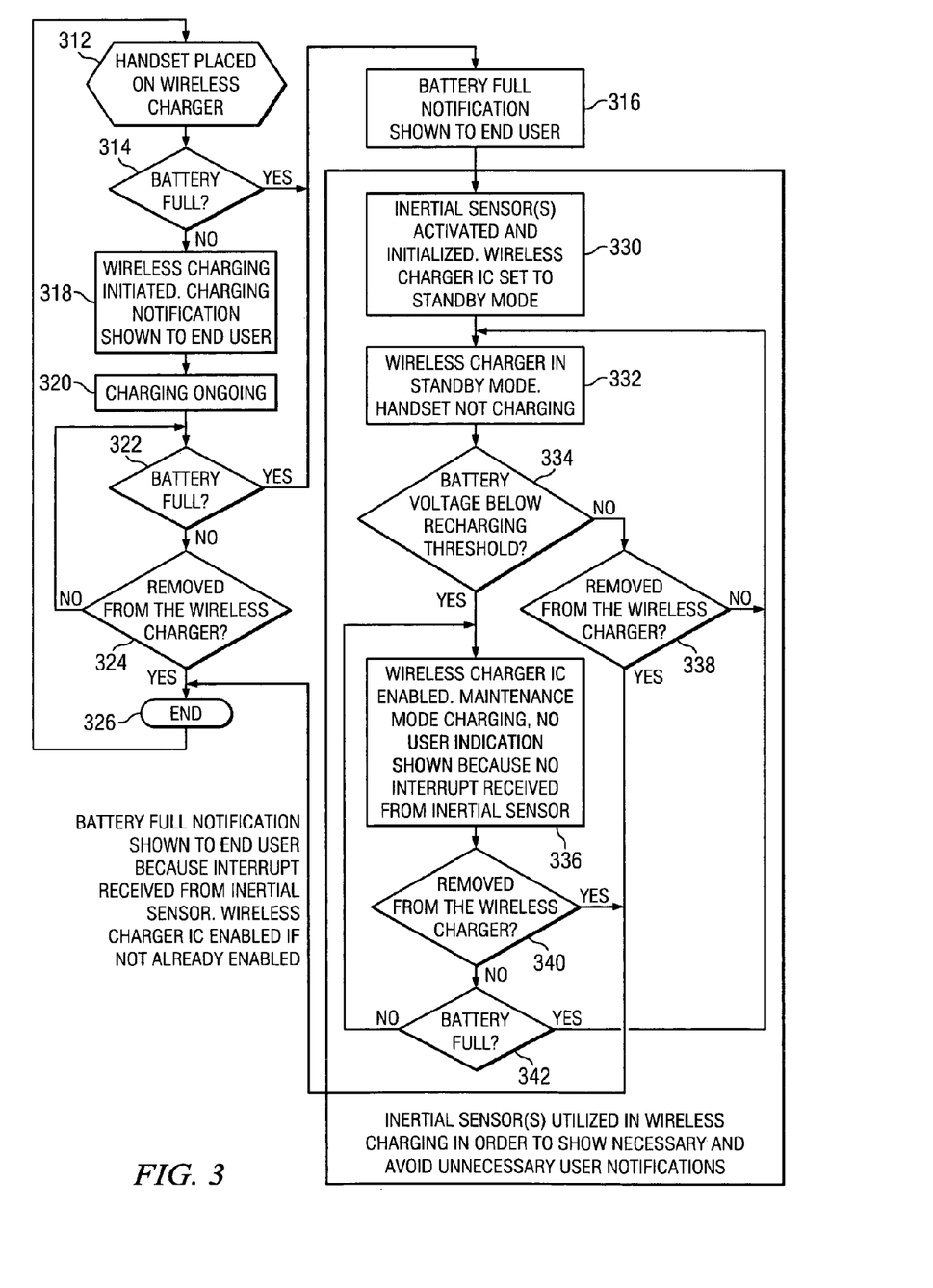
FIG. 3 shows an example of a flow diagram illustrating the charging states of the inertial sensor(s) assisted wireless charger.
Figure 4:
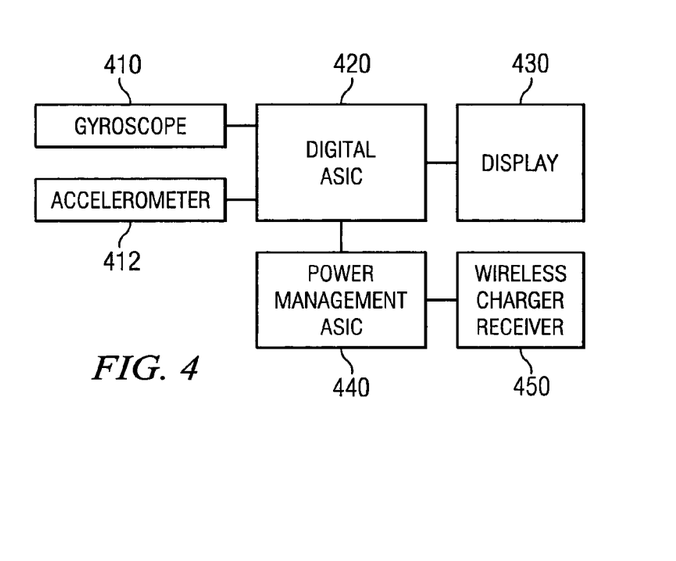
FIG. 4 shows an example of HW connections inside the inertial sensor(s) assisted wireless charger.

FIG. 3 shows an example of a SW and HW implementation in a flow chart and more particularly the charging states with inertial sensor(s) assisted wireless charging process.

At step 312, a handset is placed on a wireless charger or a connection-less charging system.

At step 314, it is determined if the handset battery is full?

At step 316, if the handset battery is full, a battery full message is shown to the end user.

At step 318, if the handset battery is not full, the wireless charging process is initiated and the charging notification can be read by the end user.

At step 320, the charging process is ongoing until the handset battery is full.

At step 322, it is determined if the handset battery is full?

If the battery is full, the battery full notification is shown to the end user at step 316.

If the battery is not full yet, at step 324, it determined if the handset is removed from the wireless charger or the connection-less charging system.

If the handset is not removed from the wireless charger or the connection-less charging system, the handset battery continued to be tested periodically if it is full at step 322 or if the handset is removed from the wireless charger or the connection-less charging system at step 324.

If the handset is removed from the wireless charger or the connection-less charging system, the process then ends at step 326.

Once the battery full notification is shown to the end user at step 316, the inertial sensor(s) are activated and initialized at step 330. These inertial sensor(s) are utilized in the wireless charging process in order to avoid unnecessary or misleading user notifications. These inertial sensor(s) which can be for instance either a gyroscope or an accelerometer or a combination of both a gyroscope and an accelerometer are implemented inside the handset or the electrical device to detection its motion.

At step 332, the wireless charger or the connection-less charging system is in standby mode and no current is provided to the phone and the handset or the electrical device is not charging.

At step 334, it is determined whether the battery voltage is below a recharging threshold?

If it is below the recharging threshold, at step 336, the wireless charger or the connection-less charging system IC is enabled and the maintenance charging mode is entered. There is no user indication since no interrupt is received from the inertial sensor(s). In this way there is not waste of energy by not notifying to the end user on the handset or electrical device display.

At step 340, it is determined whether the handset is removed from the wireless charger or the connection-less charging system. The wireless charger/transmitter is a wireless charger pad on which the device is positioned.

If it is removed from the wireless charger or the connection-less charging system, the process ends at step 326 and the battery full message is shown to the end user because an interrupt is received from the inertial sensor(s). The wireless charger IC is enabled if not already enabled.

If it is not removed from the wireless charger or the connection-less charging system, it is further determined whether the battery is full at step 342.

If the battery is full, the process loops back to step 332, where the wireless charger or the connection-less charging system is in standby mode and no current is provided to the phone and the handset or the electrical device is not charging.

If the battery is not full, the process loops back to step 336, where the wireless charger IC or the connection-less charging system IC is enabled and the maintenance charging mode is entered. There is no user indication since no interrupt is received from the inertial sensor(s).

On the other hand, if the battery voltage is not below the recharging threshold at step 334, it is further determined whether the handset is removed from the wireless charger or the connection-less charging system at step 338.

If it is not removed from the wireless charger or the connection-less charging system, the process loops back to step 332, where the wireless charger or the connection-less charging system is in standby mode and no current is provided to the phone and the handset or the electrical device is not charging.

If the handset is removed from the wireless charger or the connection-less charging system, the process ends at step 326 and the battery full message is shown to the end user because an interrupt is received from the inertial sensor(s). The wireless charger or the connection-less charging system IC is enabled if not already enabled.

FIG. 4 shows a simplified example illustration of HW connections of an electrical device or a handset with embedded inertial sensor(s) assisted wireless charging functionality.

Any type of inertial sensor can be used as long it can detect the motion of the handset or the electrical device. The embedded inertial sensor(s) can be for instance either a gyroscope or an accelerometer or a combination of both a gyroscope and an accelerometer implemented inside the handset or the electrical device to detection its motion. The accelerometer measures the movement of the handset or electrical device or its proper acceleration. The accelerator can be single or multi-axis. The accelerator can also be used to measure the vibration of the handset or electrical device. The gyroscope is a device used for measuring based on the principles of angular movement or momentum. It is particularly used in micro-chip package MEMS technologies. The combination of both a gyroscope and an accelerometer is particular accurate for measuring the movement of a handset or electrical device in the three dimensional axis.

In this example of illustration, a gyroscope 410 is connected to a digital ASIC 420. In parallel to the gyroscope 410, an accelerometer 412 is also connected to the digital ASIC 420 which can monitor the signals received from both the accelerometer and the gyroscope to determine the motion of the handset or electrical device. A Display 430 is connected to digital ASIC 420 as well.

On the other side, a wireless charger receiver or a connection-less charging system 450 is connected to a power management ASIC 440 which in turn is connected to the digital ASIC 420.

In brief the gyroscope and the accelerometer are inertial sensors. The gyroscope 410 measures orientation and the accelerometer 412 measures acceleration. In the state of the art, inertial sensors are able to provide interrupts based on pre-programmed set of rules. In an exemplary implementation, the art inertial sensors are able to provide information to host (e.g. digital ASIC) when device is moved or taken into hand and returned back to the receiver or to a table.

Digital ASIC 420 is a processor of the handset or the electrical device and it is able to control all peripheral components. The Digital ASIC 420 also can contain execution code for performing certain program or for executing instructions code.

The power management ASIC 440 monitors the energy of the handset or electrical device and can for instance compare the power level of the handset battery to the recharging threshold. For example, the power management ASIC 440 can monitor the charging process of the peripherals such as the display 439, the digital ASIC 420 etc.

The wireless charger receiver or the connection-less charging system 450 may include a coil which is used to transfer energy from the wireless charger or the connection-less charging system to the power management ASIC 440 of the device in order to perform the wireless charging.

As previously mentioned, the wireless charger may be of any type of connection-less charging system receiving power from a power source. The wireless charger or the connection-less charging system is able to convert the received power into a power signal that could be received by a transducer circuit of the handset. The transducer is able to convert the power signal into a form of energy that could be stored in the handset battery. Such power signal capable of transporting energy without requiring connection or physical structure is known in the art.

Embodiments of the present invention may be implemented in software, hardware, application logic or a combination of software, hardware and application logic. If desired, part of the software, application logic and/or hardware may reside on FIGS. 1, 2, 3 and 4. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted in FIG. 4. A computer-readable medium may comprise a computer-readable storage medium that may be any media or means that can contain or store the instructions for use by or in connection with an instruction execution system, apparatus, or device, such as a computer.

Figure 5:
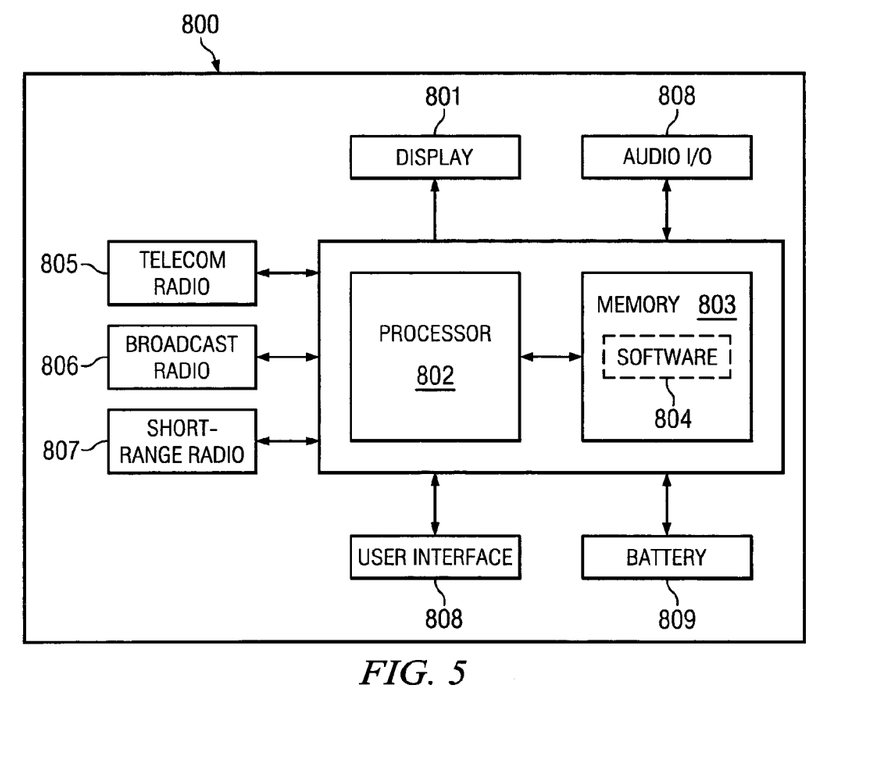
FIG. 5 presents an exemplary apparatus where one or more embodiments presented herein may be implemented.

FIG. 5 presents an exemplary apparatus where one or more embodiments presented herein may be implemented. Apparatus 800 may include at least one processor 802 in connection with at least one memory 803 or other computer readable media. Memory 803 may be any type if information storing media including random access memory (RAM), read-only memory (ROM), programmable readable memory (PROM), erasable programmable memory (EPROM) and the like, and it may contain software in form of computer executable instructions.

Apparatus 800 may also comprise one or more radios, for example telecom radio 805, broadcast radio 806, or short-range radio 807 such as Bluetooth radio or a wireless local area network (WLAN) radio. Apparatus 800 may further comprise a user interface 808, display 801, and audio input/output 808 for communicating with the user. The apparatus may also comprise a battery for delivering power for various operations performed in the device.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

What is claimed is:

1. A method, comprising:
    initiating, by a wireless charger, a wireless charging of a handset that is detected as present on the wireless charger and a transmission of a charging notification to a user of the handset;
    sending, by the wireless charger, a full charge message to the user when the wireless charging is complete and terminated;
    setting, by the wireless charger, the handset to a standby mode and initializing at least one inertial sensor to provide at least one interrupt signal monitoring a motion of the handset from the wireless charger;
    entering, by the wireless charger, a maintenance charging mode to charge the handset without notifying the user, when a power level of the handset is below a recharging threshold; and
    continuing the maintenance charging mode of the wireless charger until the handset is fully charged, or until the at least one interrupt signal is generated.

2. The method of claim 1 wherein:
    the at least one interrupt signal is transmitted when the handset is removed from the wireless charger and when the handset is returned back to the wireless charger.

3. The method of claim 1, further comprising:
    monitoring a battery voltage of the handset, if the battery voltage is above a charging threshold, the wireless charging is not initiated and the full charge message is notified to the user, and if the battery voltage is below the charging threshold, the wireless charging is initiated and the charging notification is transmitted to the user; and
    terminating the wireless charging and setting a wireless charging IC of the wireless charger to a standby mode when the handset is fully charged.

4. The method of claim 3 further comprising:
    in response to the at least one interrupt signal, sending a full charge message to the user when the handset is removed from the wireless charger while in a standby mode.

5. The method of claim 1, wherein the charging notifications and the full charge messages are transmitted to the user and displayed on a charging screen LED or on a screen of the handset.

6. The method of claim 1, wherein the handset is a phone or an electrical device.

7. The method of claim 1, wherein the wireless charger is a wireless charger pad on which the handset is positioned.

8. An apparatus, comprising:
    at least one processor; and
    at least one memory including computer program code for one or more programs;
    the at least one memory and the computer program code configured to, with the at least one processor, cause the apparatus embedded in a wireless charger to perform at least the following:

initiate a wireless charging of a handset that is detected as present on the wireless charger and a transmission of a charging notification to a user of the handset;

send a full charge message to the user when the wireless charging is complete and terminated;

set the handset to a standby mode and initializing at least one inertial sensor to provide at least one interrupt signal monitoring a motion of the handset from the wireless charger;

enter a maintenance charging mode to charge the handset without notifying the user, when a power level of the handset is below a recharging threshold; and continue the maintenance charging mode until the handset is fully charged, or until the at least one interrupt signal is generated.

9. The apparatus of claim 8, wherein the at least one interrupt signal is transmitted when the handset is removed from the wireless charger and when the handset is returned back to the wireless charger, and wherein the apparatus is further caused to:

monitor a battery voltage of the handset, if the battery voltage is above a charging threshold, the wireless charging is not initiated and the full charge message is notified to the user, and if the battery voltage is below the charging threshold, the wireless charging is initiated and the charging notification is transmitted to the user; and transmit the wireless charging and setting a wireless charging IC of the wireless charger to a standby mode when the handset is fully charged.

10. A non-transitory computer-readable storage medium carrying one or more sequences of one or more instructions which, when executed by one or more processors, cause a wireless charger to at least perform the following steps:

initiating a wireless charging of a handset that is detected as present on the wireless charger and a transmission of a charging notification to a user of the handset;

sending a full charge message to the user when the wireless charging is complete and terminated;

setting the handset to a standby mode and initializing at least one inertial sensor to provide at least one interrupt signal monitoring a motion of the handset from the wireless charger;

entering a maintenance charging mode to charge the handset without notifying the user, when a power level of the handset is below a recharging threshold; and continuing the maintenance charging mode of the wireless charger until the handset is fully charged, or until the at least one interrupt signal is generated.

11. The non-transitory computer-readable storage medium of claim 10, wherein the at least one interrupt signal is transmitted when the handset is removed from the wireless charger and when the handset is returned back to the wireless charger, and the wireless charger is caused to further perform:

monitoring a battery voltage of the handset, if the battery voltage is above a charging threshold, the wireless charging is not initiated and the full charge message is notified to the user, and if the battery voltage is below the charging threshold, the wireless charging is initiated and the charging notification is transmitted to the user; and terminating the wireless charging and setting a wireless charging IC of the wireless charger to a standby mode when the handset is fully charged.

12. The non-transitory computer-readable storage medium of claim 10, wherein the wireless charger is caused to further perform:

in response to the at least one interrupt signal, sending a full charge message to the user when the handset is removed from the wireless charger while in a standby mode.

\* \* \* \* \*

UNITED STATES PATENT AND TRADEMARK OFFICE
CERTIFICATE OF CORRECTION

PATENT NO. : 9,653,938 B2
APPLICATION NO. : 14/362812
DATED : May 16, 2017
INVENTOR(S) : Mika-Petteri Lundgren et al.

It is certified that error appears in the above-identified patent and that said Letters Patent is hereby corrected as shown below:

On the Title Page

Item (54) and in the Specification, Column 1, Lines 1-4, the Title information which reads:
"METHOD AND APPARATUS FOR IMPROVING ELECTRONICS DEVICES WIRELESS CHARGING USING INERTIAL SENSORS"

Should read:
"METHOD AND APPARATUS FOR IMPROVING ELECTRONIC DEVICES WIRELESS CHARGING USING INERTIAL SENSORS"

Signed and Sealed this
Eleventh Day of July, 2017

Joseph Matal
*Performing the Functions and Duties of the*
*Under Secretary of Commerce for Intellectual Property and*
*Director of the United States Patent and Trademark Office*